(12) United States Patent
Greminger

(10) Patent No.: US 8,254,062 B2
(45) Date of Patent: Aug. 28, 2012

(54) RECESSED BASE PLATE FOR DATA TRANSDUCER SUSPENSION

(75) Inventor: Michael Allen Greminger, St. Anthony, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 499 days.

(21) Appl. No.: 12/491,951

(22) Filed: Jun. 25, 2009

(65) Prior Publication Data

US 2010/0097727 A1 Apr. 22, 2010

Related U.S. Application Data

(63) Continuation-in-part of application No. 12/254,671, filed on Oct. 20, 2008, now Pat. No. 8,144,435.

(51) Int. Cl.
  G11B 21/16 (2006.01)
  G11B 5/596 (2006.01)
(52) U.S. Cl. .......... 360/244.5; 360/244.6; 360/294.4
(58) Field of Classification Search ........... 360/244.5, 360/244.6, 294.4
See application file for complete search history.

(56) References Cited

U.S. PATENT DOCUMENTS

| | | | |
|---|---|---|---|
| 5,805,382 A | 9/1998 | Lee et al. | |
| 6,063,508 A * | 5/2000 | Hanrahan et al. | 428/596 |
| 6,215,625 B1 | 4/2001 | Carlson | |
| 6,252,743 B1 * | 6/2001 | Bozorgi | 360/244.1 |
| 6,404,593 B1 * | 6/2002 | Iwamoto | 360/244.6 |
| 6,469,869 B1 | 10/2002 | Vera | |
| 6,501,625 B1 | 12/2002 | Boismier et al. | |
| 6,522,624 B2 | 2/2003 | Budde | |
| 6,597,538 B1 | 7/2003 | Kashima et al. | |
| 6,885,525 B1 | 4/2005 | Utsunomiya | |
| 6,961,210 B2 | 11/2005 | Sheu | |
| 7,023,667 B2 | 4/2006 | Shum | |
| 7,224,555 B2 | 5/2007 | Ando et al. | |
| 7,554,773 B2 | 6/2009 | Zhu et al. | |
| 7,624,495 B1 | 12/2009 | Crowder et al. | |
| 7,719,798 B2 | 5/2010 | Yao | |
| 2001/0043443 A1 | 11/2001 | Okamoto et al. | |
| 2006/0221503 A1 * | 10/2006 | Watadani et al. | 360/244.8 |
| 2008/0024927 A1 * | 1/2008 | Hong et al. | 360/244.2 |
| 2009/0027807 A1 | 1/2009 | Yao et al. | |
| 2009/0086379 A1 | 4/2009 | Hanya et al. | |
| 2010/0073824 A1 * | 3/2010 | Nojima | 360/294.4 |
| 2010/0097726 A1 | 4/2010 | Greminger et al. | |

FOREIGN PATENT DOCUMENTS

| | | | |
|---|---|---|---|
| JP | 60136978 A | * | 7/1985 |
| JP | 2001126423 A | * | 5/2001 |
| JP | 2002050140 A | * | 2/2002 |

* cited by examiner

*Primary Examiner* — Will J Klimowicz
(74) *Attorney, Agent, or Firm* — Kagan Binder, PLLC

(57) ABSTRACT

A suspension assembly with reduced total vertical thickness is provided for a data transducing system that includes a dual-stage actuation system for positioning a data transducer. A first structural element of the suspension assembly includes a plate portion and a boss tower that is connectable to a main actuator of the dual-stage actuation system. A second structural element of the suspension assembly includes a recess that receives the plate portion of the first structural element, an opening through which the boss tower extends for connection to the main actuator of the dual-stage actuation system, and a flexible region to which a microactuator element of the dual-stage actuation system is connected. The suspension assembly also includes a support structure connected to the flexible region of the second structural element that carries the data transducer, and an electrical circuit connection system for making electrical connections to the data transducer and to the microactuator of the dual-stage actuation system.

19 Claims, 5 Drawing Sheets

RECESSED BASE PLATE FOR DATA TRANSDUCER SUSPENSION

CROSS-REFERENCE TO RELATED APPLICATION(S)

This application is a continuation-in-part of U.S. application Ser. No. 12/254,671 filed Oct. 20, 2008 for "Cost Reduced Microactuator Suspension" by M. Greminger, J. Wright, M. Bowers and B. Ver Meer, the content of which is hereby incorporated by reference in its entirety.

BACKGROUND

The density of data stored on media in data transducing systems continues to increase, requiring more precise positioning of the transducing head. Conventionally, in many systems, head positioning is accomplished by operating an actuator arm with a large scale actuation motor, such as a voice coil motor, to position a head on a flexure at the of the suspension arm. The large scale motor lacks sufficient resolution to effectively accommodate high data density. A high resolution head positioning mechanism, or microactuator, is advantageous to accommodate the high data density.

As data transducing systems are developed for diverse applications, including portable electronics for example, it is often desirable to provide a device that has a small vertical thickness. However, for dual stage systems that include a large scale actuation motor and a suspension-level microactuator, a piezoelectric element and a suspension stiffening element are employed that increase vertical thickness. Increased vertical thickness limits the interconnect options to the piezoelectric element and also has a negative effect on the shock performance of the device, in addition to increasing the weight and footprint of the device. A design that allows for dual stage actuation with reduced vertical thickness compared to prior dual stage designs would be desirable.

SUMMARY

The present invention is directed to a suspension assembly for a data transducing system that includes a dual-stage actuation system for positioning a data transducer. A first structural element of the suspension assembly includes a plate portion and a boss tower that is connectable to a main actuator of the dual-stage actuation system. A second structural element of the suspension assembly includes a recess that receives the plate portion of the first structural element, an opening through which the boss tower extends for connection to the main actuator of the dual-stage actuation system, and a flexible region to which a microactuator element of the dual-stage actuation system is connected. The suspension assembly also includes a support structure connected to the flexible region of the second structural element that carries the data transducer, and an electrical circuit connection system for making electrical connections to the data transducer and to the microactuator of the dual-stage actuation system.

DETAILED DESCRIPTION

Figure 1:
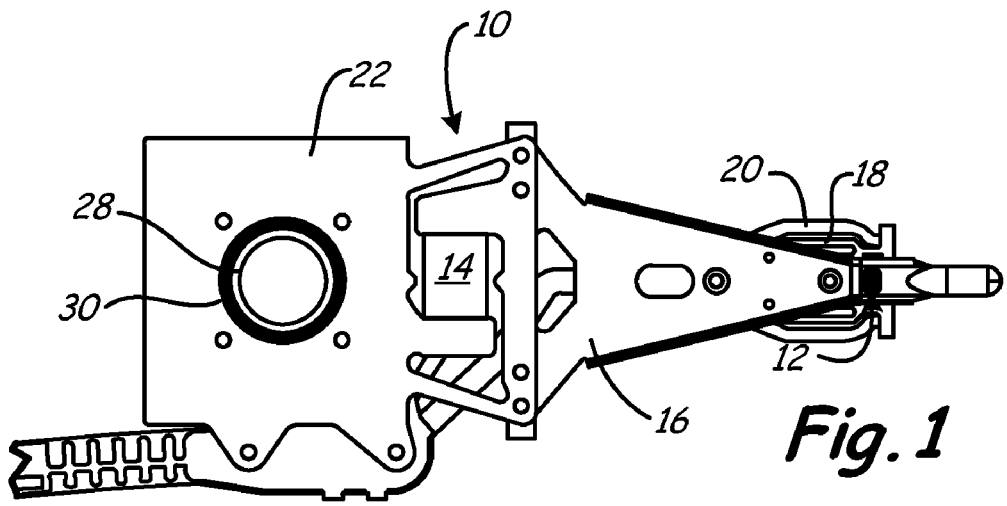
FIG. 1 is a top view of a suspension assembly according to an embodiment of the present invention used with a first version of a dual stage actuation system.
Figure 2:
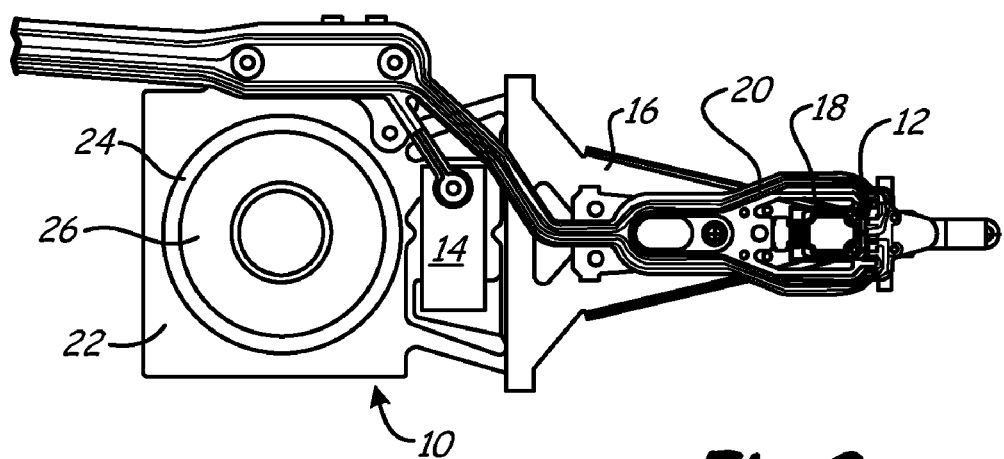
FIG. 2 is a bottom view of the suspension assembly shown in FIG. 1.
Figure 3:
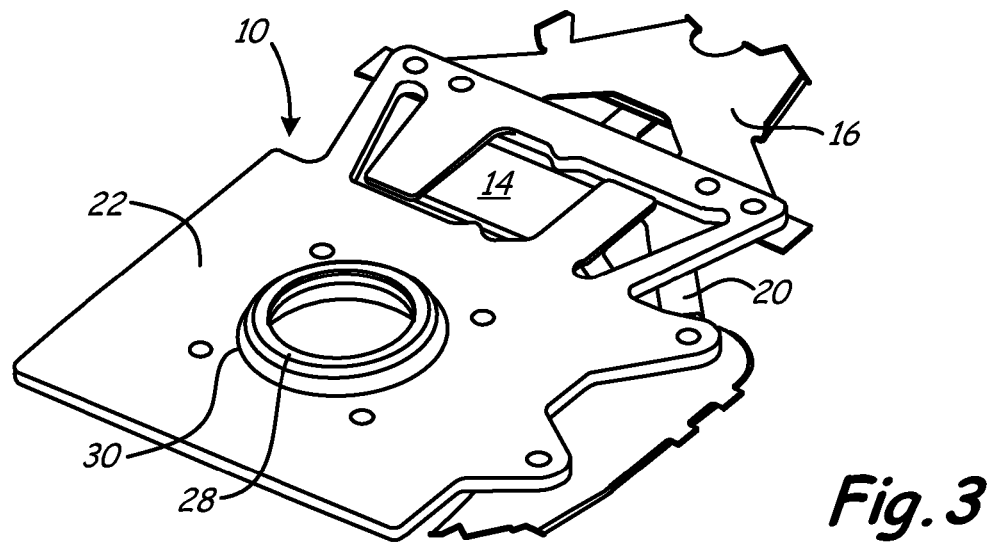
FIG. 3 is a top perspective view of the suspension assembly shown in FIG. 1.
Figure 4:
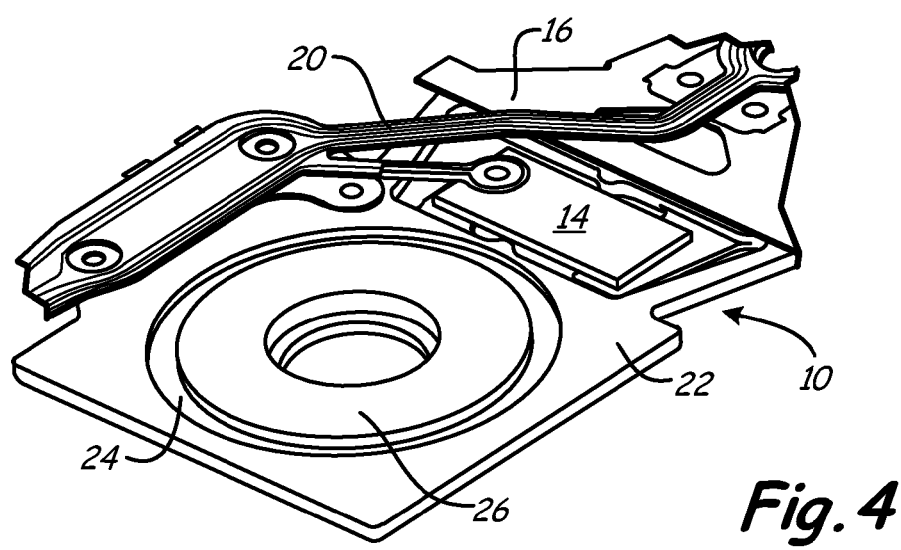
FIG. 4 is a bottom perspective view of the suspension assembly shown in FIG. 1.

FIG. 1 is a top view, FIG. 2 is a bottom view, FIG. 3 is a top perspective view, and FIG. 4 is a bottom perspective view, of suspension assembly 10 according to an embodiment of the present invention, used with a first version of a dual stage actuation system. The dual stage actuation system employs a main actuator (not shown) for coarse positioning of data transducer 12 via movement of an actuator arm (not shown) that connects to suspension 10, and also employs microactuator element 14 for fine, higher resolution positioning of data transducer 12. In the example shown in FIGS. 1-4, microactuator element 14 is a piezoelectric element that is responsive to electrical signals to move the support assembly that carries data transducer 12, which includes load beam 16 and flexure 18. Data transducer 12 is electrically connected via conductive traces carried by flex circuit 20. The location of transducer 12 on suspension 10 shown in FIG. 1 is just one possible embodiment; for example, transducer 12 could be located further away from load beam 16 on flexure 18 in some embodiments.

The use of microactuator element 14 may require stiffener 22 to be employed so that data transducer 12 can be positioned with the required frequency and resonance response needed to effectively read and write data. In many prior designs, the stiffener and the base plate (for connection to the actuator arm) each had a vertical height of 5 milli-inches (mils) or more, so that the total vertical height of the suspension assembly would be well over 10 mils. In some applications, this results in a stiffener-to-media clearance that is quite small, resulting in poor shock resistance performance, and limiting the options for electrical interconnection to the microactuator element.

As shown in FIGS. 1-4, suspension assembly 10 employs stiffener 22 having recess 24, within which base plate 26 is located. Boss tower 28 extends through opening 30 in stiffener 22 for connection to the actuator arm in a conventional manner, although boss tower 28 has more vertical height than in prior designs because it extends through stiffener 22. Stiffener 22 may include asymmetrical mounting tabs for connection to symmetrically located microactuator element 14.

In the embodiment shown in FIGS. 1-4, base plate 26 and microactuator element 14 are both located proximate the same side of stiffener 22 (opposite the actuator arm), in recessed areas of stiffener 22. This configuration reduces the vertical height of suspension assembly 10, and also reduces the total weight of suspension assembly due to the removal of material from stiffener 22, with only a minimal penalty in the resonance performance of suspension assembly 10 (which is compensated for by the use of microactuator element 14 to achieve fine positioning with high frequency performance). The reduced vertical height and weight of suspension assembly 10 improves the shock resistance of the device.

Base plate 26 is shown having a generally circular shape, which minimizes the total area of base plate 26 and of generally corresponding recess 24 in stiffener 22 for receiving base plate 26. In other embodiments, base plate 26 may have other shapes and sizes (such as polygons, ovals, etc.), and recess 24 in stiffener 22 may have a shape and size which generally corresponds to the shape and size of base plate 26. Other variations in the relationship between the shape and size of base plate 26 and recess 24 in stiffener 22 are contemplated by the present invention as well.

Figure 5:
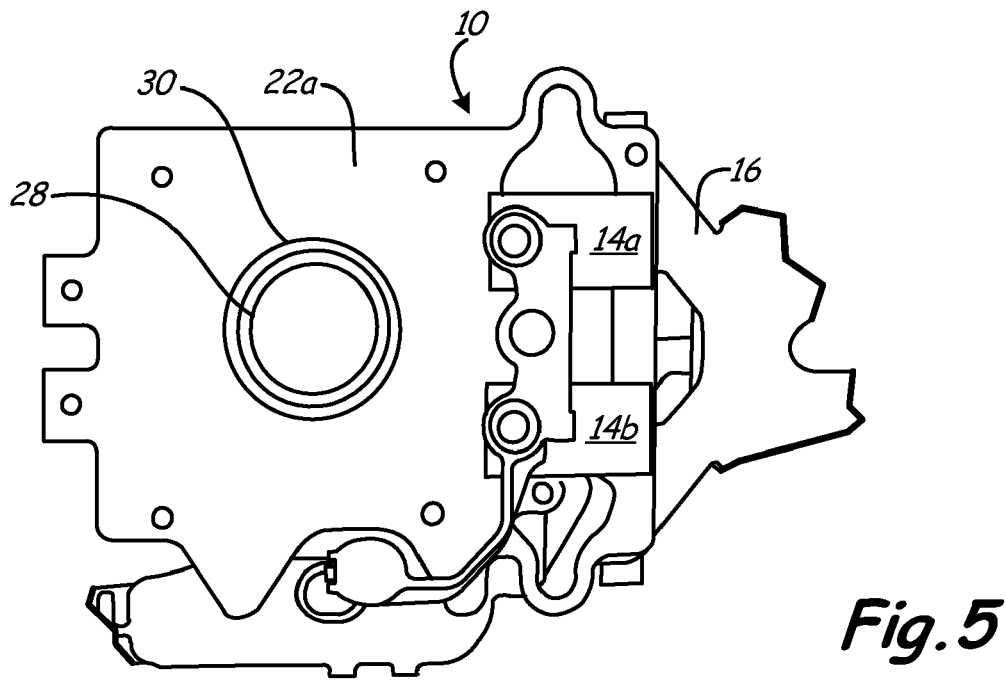
FIG. 5 is a top view of a suspension assembly according to an embodiment of the present invention used with a second version of a dual stage actuation system.
Figure 6:
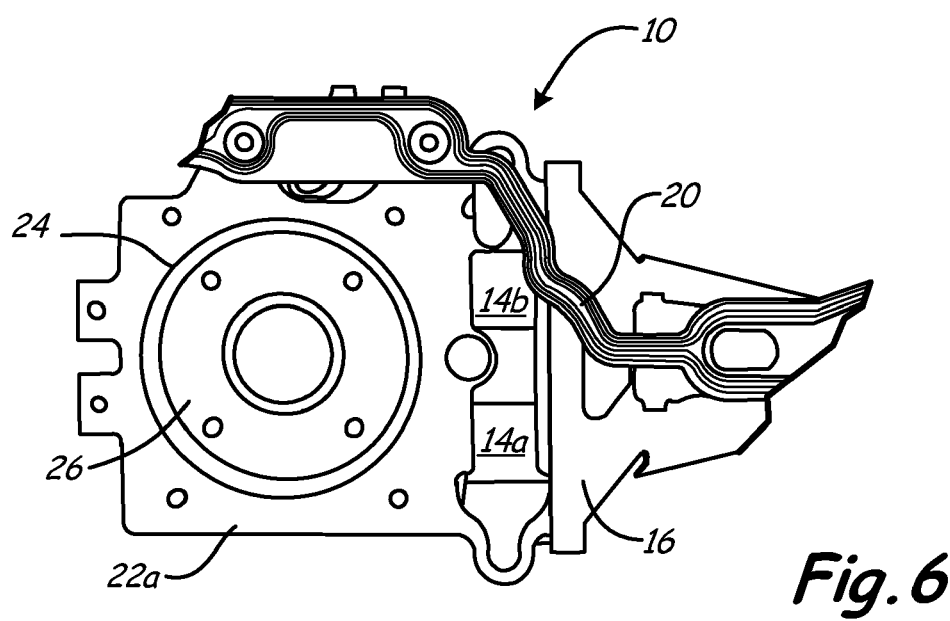
FIG. 6 is a bottom view of the suspension assembly shown in FIG. 5.
Figure 7:
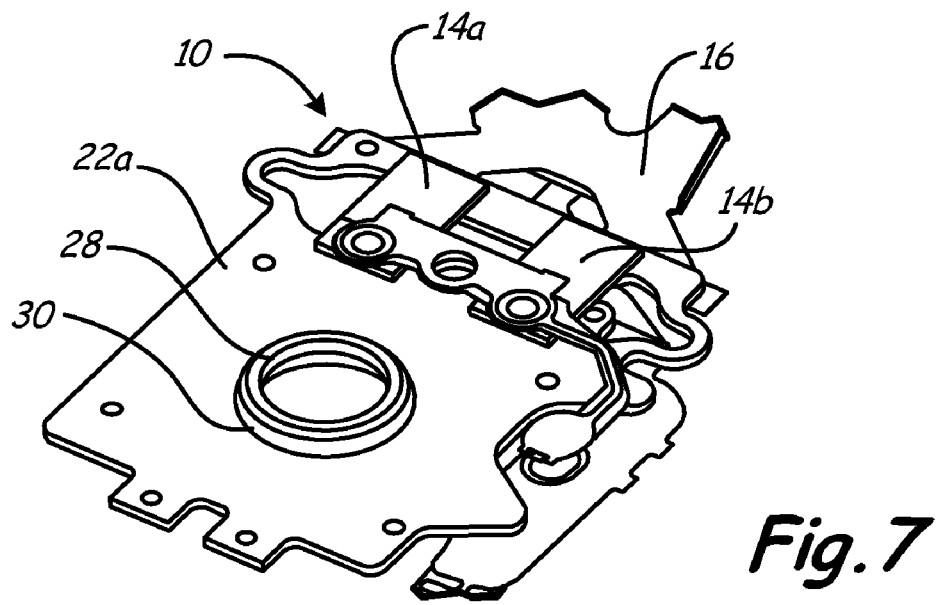
FIG. 7 is a top perspective view of the suspension assembly shown in FIG. 5.
Figure 8:
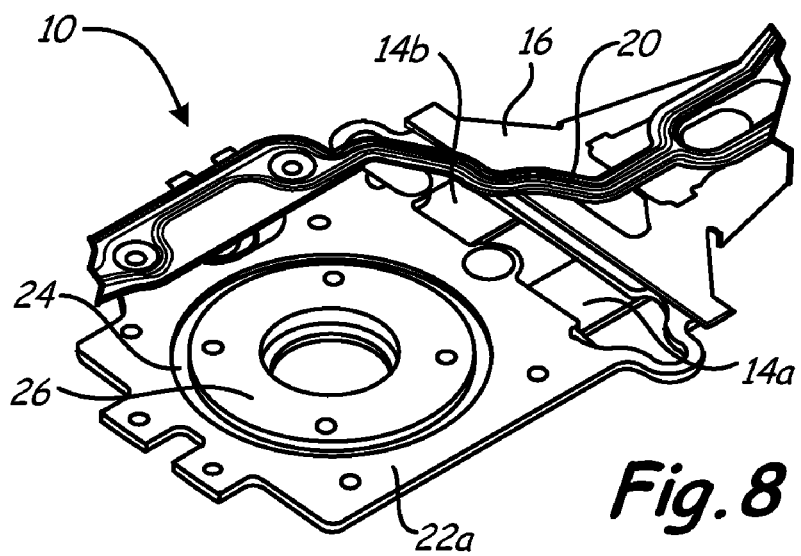
FIG. 8 is a bottom perspective view of the suspension assembly shown in FIG. 5.

FIG. 5 is a top view, FIG. 6 is a bottom view, FIG. 7 is a top perspective view, and FIG. 8 is a bottom perspective view, of suspension assembly 10 according to an embodiment of the present invention, used with a second version of a dual stage actuation system. The system shown in FIGS. 5-8 is nearly identical to the system shown in FIGS. 1-4, except that dual microactuator elements 14a and 14b (FIGS. 5-8) are used in place of microactuator element 14 shown in FIGS. 1-4. Stiffener 22a (FIGS. 5-8) is a reconfigured version of stiffener 22 shown in FIGS. 1-4 to account for the use of dual microactuator elements 14a and 14b. In addition, while microactuator element 14 in FIGS. 1-4 was shown as being located in a recessed portion of stiffener 22, microactuator elements 14a and 14b in FIGS. 5-8 are located proximate the side opposite data transducer 12 of stiffener 22a. In other embodiments, more than two microactuator elements may be used.

Figure 9:
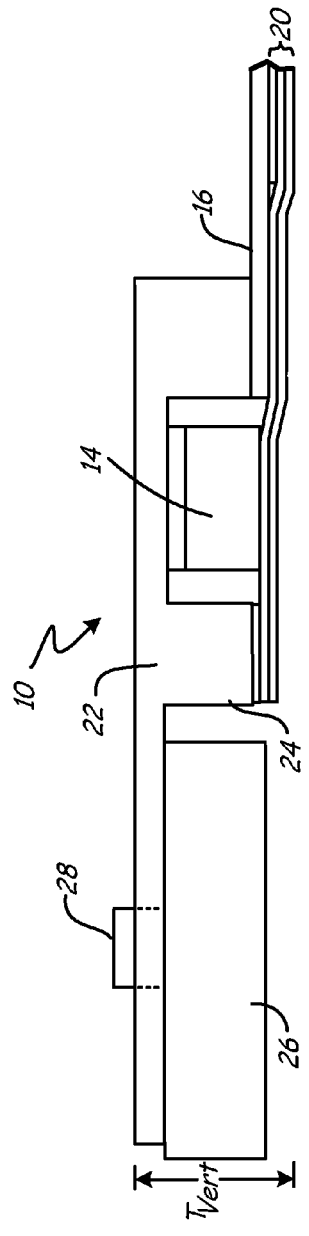
FIG. 9 is a side view of a suspension assembly according to an embodiment of the present invention, showing its total vertical thickness.
Figure 10:
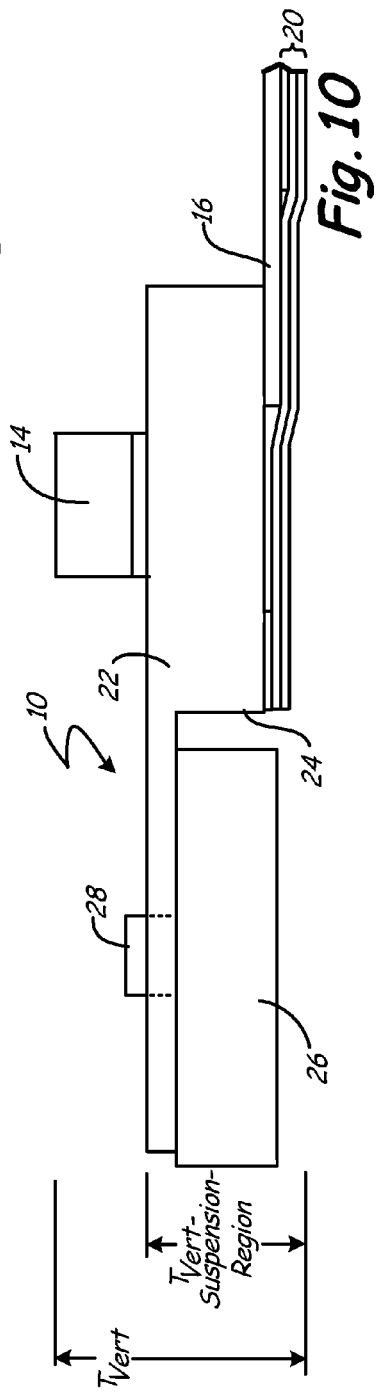
FIG. 10 is a side view of a suspension assembly according to another embodiment of the present invention, showing its total vertical thickness.
Figure 11:
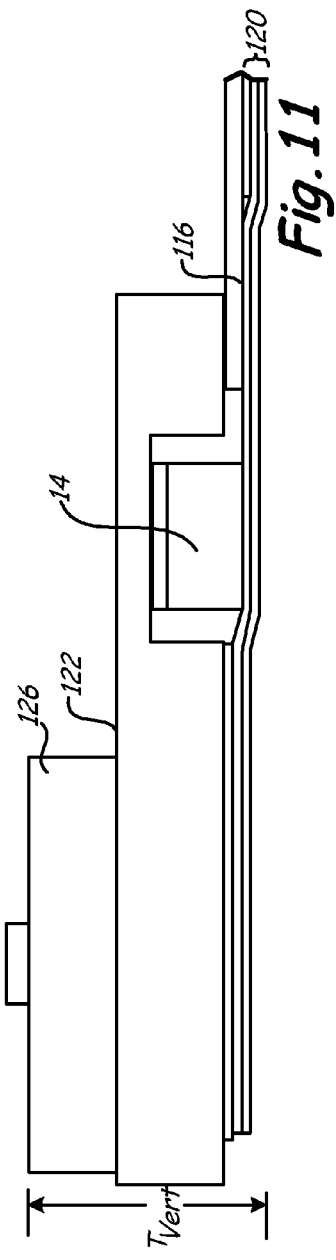
FIG. 11 is a side view of a different suspension assembly, showing its total vertical thickness.

FIGS. 9 and 10 are side views of suspension assembly 10 according to embodiments of the present invention, and FIG. 11 is a side view of a non-recessed base plate suspension assembly, showing the total vertical thickness of both assemblies for purposes of comparison. Vertical thickness is measured from a high point where the actuator arm attaches to the suspension, to a low point at the interface between the stiffener and load beam (with the lowest component typically being the flex circuit), shown in FIGS. 9-11 as $T_{Vert}$. The configuration shown in FIG. 9 employs microactuator element 14 on the bottom of a recessed portion of stiffener 22, while the configuration shown in FIG. 10 employs microactuator element 14 on top of stiffener 22. The configuration shown in FIG. 9 allows the total vertical thickness $T_{Vert}$ of suspension assembly 10 to be reduced to less than 10 mils. For example, suspension assembly 10, as shown in FIG. 9, has a total vertical thickness $T_{Vert}$ of about 8.5 mils. Specifically, suspension assembly 10 (FIG. 9) includes stiffener 22 (5.9 mils), base plate 26 (5 mils), load beam 16 (1 mil), and flex circuit 20 (1.6 mils). Flex circuit 20 includes a stainless steel layer (0.7 mils), a polyimide layer (0.4 mils), and a copper layer (0.5 mils). The vertical thickness of suspension assembly 10 is composed of stiffener 22, load beam 16, and flex circuit 20; base plate 26 does not add to the vertical thickness because it is located in recess 24 of stiffener 22. The configuration of suspension assembly 10 shown in FIG. 10 has also has a low vertical thickness $T_{Vert\text{-}Suspension\text{-}Region}$ (less than 10 mils) in the region near boss tower 28, due to base plate 26 being located in recess 24 of stiffener 22. The vertical thickness $T_{Vert}$ in the region where microactuator 14 is attached to stiffener 22 is greater than in the configuration shown in FIG. 9, but vertical thickness is a less important parameter in that region of suspension 10, and the greater vertical thickness in that region is acceptable in many applications. In comparison, the non-recessed base plate suspension assembly shown in FIG. 11 has a total vertical thickness $T_{Vert}$ of about 12.6 mils. The non-recessed base plate suspension assembly shown in FIG. 11 includes stiffener 122 (5 mils), base plate 126 (5 mils), load beam 116 (1 mil), and flex circuit 120 (1.6 mils). In this assembly, base plate 126 and stiffener 122 both add to the total vertical thickness.

Stiffener 22 shown in FIGS. 9 and 10 is thicker than stiffener 122 shown in FIG. 11 (e.g., by 0.9 mils). This additional thickness is provided to improve the resonance performance of suspension assembly 10, resulting in only a small reduction in resonance performance for the configuration shown in FIGS. 9 and 10 compared to the configuration shown in FIG. 11.

In an alternative embodiment of suspension assembly shown in FIG. 9, flex circuit 20 may be moved to the top of stiffener 22 in the region adjacent base plate 26. In this configuration, flex circuit 20 passes through an opening in stiffener 22 or load beam 16 to reach the bottom of load beam 16 where the data transducer is carried. This configuration results in a lower vertical thickness component from stiffener 22 to the media (which in many systems is the dimension of interest for shock resistance), although its assembly is slightly more complex.

In exemplary embodiments of the configurations of suspension assembly 10 described herein, stiffener 22 and base plate 26 are both composed of stainless steel. Base plate 26 is typically formed by a stamping process, while stiffener 22 (and specifically, recess 24 in stiffener 22) is formed by a process such as etching. Boss tower 28 is typically connected to the actuator arm by a process such as swaging, as is known in the art. Base plate 26 may be attached to stiffener 22 in a number of ways, including by laser welding, conductive adhesive, or other attachment methods generally known in the art.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Components referred to as being on "top," "above," on "bottom" or "below" are only used for clarification, and other designs that change these relative positions are also part of the present invention. Therefore, it is intended that the invention not be limited to the particular embodiment(s) disclosed, but that the invention will include all embodiments falling within the scope of the appended claims.

The invention claimed is:

1. A suspension assembly that includes a dual-stage actuation system for positioning a data transducer, the suspension assembly comprising:
   a first structural element comprising:
      a plate portion having a first side and an opposite second side; and
      a boss tower on the first side that is connectable to a main actuator of the dual-stage actuation system;
   a second structural element comprising:
      a recess having a bottom surface that receives the first side of the plate portion of the first structural element against the bottom surface;
      an opening in the bottom surface through which the boss tower extends; and
      a flexible region to which a microactuator element of the dual-stage actuation system is connected;

a support structure connected to the flexible region of the second structural element that carries the data transducer; and an electrical circuit connection system for making electrical connections to the data transducer and to the microactuator of the dual-stage actuation system.

2. The suspension assembly of claim 1, wherein the boss tower is connectable to the main actuator of the dual-stage actuation system on a first side of the suspension assembly, and the recess in the second structural element that receives the plate portion of the first structural element is located on a second side of the suspension assembly opposite the first side.

3. The suspension assembly of claim 1, wherein the support structure includes a load beam connected to the flexible region of the second structural element and a flexure connected to the load beam that carries the data transducer.

4. The suspension assembly of claim 1, wherein the plate portion of the first structural element has a circular outer perimeter shape.

5. The suspension assembly of claim 1, wherein the first structural element and the second structural element are composed of stainless steel.

6. The suspension assembly of claim 1, wherein a total vertical thickness of the suspension assembly in a region where the second structural element connects to the support structure is less than 10 milli-inches.

7. The suspension assembly of claim 1, wherein the recess in the second structural element is an etched portion of the second structural element.

8. The suspension assembly of claim 1, wherein the microactuator element comprises at least one piezoelectric element.

9. The suspension assembly of claim 8, wherein the microactuator element comprises two piezoelectric elements.

10. The suspension assembly of claim 1, wherein the second structural element has a greater vertical thickness than the plate portion of the first structural element.

11. A structural assembly for connecting a main actuator portion to a microactuator portion, the structural assembly, comprising:
    a first structural element comprising:
        a plate portion having a first side and an opposite second side; and
        a boss tower on the first side that is connectable to the main actuator portion; and
    a second structural element comprising:
        a recess having a bottom surface that receives the first side of the plate portion of the first structural element against the bottom surface;
        an opening in the bottom surface through which the boss tower extends for connection to the main actuator portion; and
        a flexible region to which the microactuator portion is connected.

12. The structural assembly of claim 11, wherein the microactuator portion comprises:
    at least one microactuator element connected to the flexible region of the second structural element;
    a load beam connected to the flexible region of the second structural element;
    a flexure connected to the load beam; and
    a data transducer carried by the flexure.

13. The structural assembly of claim 12, wherein the at least one microactuator element comprises at least one piezoelectric element.

14. The structural assembly of claim 11, wherein the plate portion of the first structural element has a circular outer perimeter shape.

15. The structural assembly of claim 11, wherein the recess in the second structural element is an etched portion of the second structural element.

16. The structural assembly of claim 11, wherein the first structural element and the second structural element are composed of stainless steel.

17. The structural assembly of claim 11, wherein the second structural element has a greater vertical thickness than the plate portion of the first structural element.

18. A structural assembly for connecting a main actuator portion to a microactuator portion, the structural assembly comprising:
    a first structural element comprising:
        a plate portion; and
        a boss tower that is connectable to the main actuator portion; and
    a second structural element comprising:
        a recess that receives the plate portion of the first structural element;
        an opening through which the boss tower extends for connection to the main actuator portion; and
        a flexible region to which the microactuator portion is connected;
    wherein the boss tower is connected to the main actuator portion on a first side of the structural assembly, and the recess in the second structural element is located on a second side of the structural assembly opposite the first side.

19. The structural assembly of claim 18, comprising a microactuator located on the second side of the structural assembly.

* * * * *